United States Patent
Lewis et al.

(10) Patent No.: US 10,531,210 B2
(45) Date of Patent: Jan. 7, 2020

(54) SYSTEMS, DEVICES, AND METHODS FOR DETECTING SPILLS USING AUDIO SENSORS

(71) Applicant: Walmart Apollo, LLC, Bentonville, AR (US)

(72) Inventors: Steven Jackson Lewis, Bentonville, AR (US); Kevin Matthew Charles, Bentonville, AR (US); Matthew Dwain Biermann, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/718,727

(22) Filed: Sep. 28, 2017

(65) Prior Publication Data

US 2018/0091909 A1 Mar. 29, 2018

Related U.S. Application Data

(60) Provisional application No. 62/401,376, filed on Sep. 29, 2016.

(51) Int. Cl.
*H04R 29/00* (2006.01)
*G10L 25/51* (2013.01)
(Continued)

(52) U.S. Cl.
CPC .............. *H04R 29/00* (2013.01); *G06F 3/16* (2013.01); *G06F 3/162* (2013.01); *G10L 25/51* (2013.01);
(Continued)

(58) Field of Classification Search
CPC .......... H04R 29/00; H04R 3/00; H04R 1/406; H04R 2201/021; H04R 2201/025;
(Continued)

(56) References Cited

U.S. PATENT DOCUMENTS 5,417,113 A * 5/1995 Hartley .................. G01M 3/24
367/125
6,389,881 B1 * 5/2002 Yang ..................... G01M 3/243
73/40.5 A (Continued)

FOREIGN PATENT DOCUMENTS

WO 2009029980 A1 3/2009

OTHER PUBLICATIONS

Samsung SmartThings Water Leak Sensor—Things—SmartThings Shop, https://shop.smartthings.com/#!/products/samsungsmart-thingswaterleaksensor, last viewed Jul. 21, 2016.

*Primary Examiner* — Leshui Zhang
(74) *Attorney, Agent, or Firm* — McCarter & English, LLP; David R. Burns (57) ABSTRACT

A technique for detecting spills is described. A number of audio sensors detect a sound potentially associated with an object spilling on a surface and the audio data from the sensors is analyzed in order to generate an acoustical analysis of the sound. The analysis of the sound detected by the audio sensors is compared against a database of known sounds corresponding to a number of types of spill incidents. Based on a match detected between the analysis of the sound and a type of spill incident in the database of known sounds, the identity of the object spilled can be determined. The location of the spilled object can also be calculated by triangulating the sensor data from the audio sensors.

19 Claims, 5 Drawing Sheets

(51) Int. Cl.
*H04R 3/00* (2006.01)
*G06F 3/16* (2006.01)
*H04R 1/40* (2006.01)
G06K 9/78 (2006.01)
G10L 21/0216 (2013.01)

(52) U.S. Cl.
CPC .............. *H04R 1/406* (2013.01); *H04R 3/00* (2013.01); *G06K 9/78* (2013.01); *G10L 2021/02166* (2013.01); *H04R 2201/021* (2013.01); *H04R 2201/025* (2013.01)

(58) Field of Classification Search
CPC . G06F 3/16; G10L 25/51; G10L 2021/02166; G06K 9/78; G01M 3/24
USPC .. 381/56, 57, 58, 91, 92, 86, 119, 122, 123; 73/587, 590, 592, 600, 601, 602, 603, 73/605, 606, 598, 40.5 A, 659; 700/94
See application file for complete search history.

(56) References Cited

U.S. PATENT DOCUMENTS

| | | |
|---|---|---|
| 6,812,846 B2 | 11/2004 | Gutta et al. |
| 8,706,540 B2 | 4/2014 | Mangat et al. |
| 8,965,623 B2 | 2/2015 | Rakshit |
| 9,159,217 B1 | 10/2015 | Logan et al. |
| 2003/0185410 A1* | 10/2003 | June ................... H04R 1/406 381/94.1 |
| 2008/0309503 A1 | 12/2008 | White et al. |
| 2014/0168427 A1* | 6/2014 | Argue ................ G06K 9/00771 348/143 |
| 2016/0019777 A1* | 1/2016 | Peterson ................ G08B 17/10 340/506 |

* cited by examiner

SYSTEMS, DEVICES, AND METHODS FOR DETECTING SPILLS USING AUDIO SENSORS

CROSS-REFERENCE TO RELATED PATENT APPLICATIONS

This application claims priority to U.S. Provisional Application No. 62/401,376 filed on Sep. 29, 2016, the content of which is hereby incorporated by reference in its entirety.

BACKGROUND

Various types of objects can fall and create spills within an enterprise, warehouse, or residence. Such objects can include, for example, glass items, liquids, and/or hazardous chemicals.

SUMMARY

Embodiments of the present invention utilize multiple audio sensors to detect sounds associated with a spill and determine the location and identity of the spilled object. In some embodiments, the audio data received by the audio sensors is processed in order to identify acoustical characteristics that can be compared against known spill sounds in order to help identify the object spilled. The audio data received by the audio sensors can also be used to triangulate the location of the spill, in some embodiments.

In one embodiment, a system for detecting spills is disclosed. The system includes a number of audio sensors configured to detect a sound potentially associated with an object spilling on a surface. The system also includes a sound processing module, executed by a processor in a processing device, that is configured to perform an analysis of the sound detected by the audio sensors. The sound processing module is also configured to compare the analysis of the sound detected by the audio sensors against a database of known sounds corresponding to multiple types of spill incidents. The sound processing module is further configured to identify the object spilled based on a match between the analysis of the sound and a type of spill incident in the database of known sounds. The spill detection system also includes a location analysis module, executed by the processor, that is configured to triangulate sensor data from the audio sensors to determine a location associated with the sound detected by the audio sensors.

In another embodiment, a method of detecting spills is disclosed that includes detecting a sound potentially associated with an object spilling on a surface using a number of audio sensors. The method also includes using a sound processing module, executed by a processor in a processing device, to perform an analysis of the sound detected by the audio sensors. The method further includes using the sound processing module to compare the analysis of the sound detected by the audio sensors against a database of known sounds corresponding to multiple types of spill incidents. The method also includes using the sound processing module to identify the object spilled based on a match between the analysis of the sound and a type of spill incident in the database of known sounds. The method further includes triangulating sensor data from the audio sensors to determine a location associated with the detected sound.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments of the present invention when read together with the accompanying drawings, in which.

DETAILED DESCRIPTION

Following below are more detailed descriptions of various concepts related to, and embodiments of, inventive methods, devices, and systems for detecting spills. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

In accordance with some embodiments, methodologies, systems, devices, and non-transitory computer-readable media are described herein to facilitate detecting spills within a facility that may be safety hazards for individuals near the spills. In some embodiments, a number of audio sensors are used to detect the sound of a spill, and the audio data collected by the audio sensors can be processed in order to determine the identity of the object spilled, as well as the location of the spill. The audio sensors can include, for example, microphones that are mounted on the walls or ceilings of a building where spills are being monitored. In some embodiments, the various microphones can be tuned to detect specific sound spectra of common spill sounds. For example, some microphones can be tuned to detect liquid spills or glass breakage while filtering out other types of sounds, such as human speech or background noise. Alternatively, in another embodiment filtering may be applied to detected sounds after the sound has been detected. In some cases, the sensitivity of the audio sensors can be adjusted or tuned after detecting a possible spill in order to listen more closely for similar spill sounds.

In one example embodiment, once the audio sensors have captured a sound that may have been caused by a spill, an acoustical analysis is performed on the audio data from the audio sensors in order to identify various features and characteristics of the detected sounds. In some embodiments, the acoustical characteristics of a sound can be identified using a Fourier analysis. These acoustical characteristics can be compared against a database of known sounds or sound profiles corresponding to known types of spill incidents. For example, the acoustical characteristics of common types of spill incidents, such as a glass bottle breaking or a liquid spilling on a tile surface, can be stored in a database and compared against the acoustical characteristics of the sounds detected by the audio sensors. If a match is detected between the sounds detected by the audio sensors and, for example, the sound of a glass bottle breaking, the spill detection system can determine that a glass bottle has fallen and broken. In some embodiments, the spill detection system can also determine the surface on which the object has fallen, as different sounds are generated when objects fall on different surfaces.

The audio data detected by the audio sensors can be further analyzed in order to determine the location of the spill. In some embodiments, the location of the audio sensors is known, and the audio data can be triangulated in order to determine the location of the spill incident. Further, the sensors in the spill detection system may be able to alter their orientation in response to a received command. In an embodiment, once the location of the spill incident is initially calculated, a command may be sent to the audio sensors, via a wireless or wired command, to adjust their orientation to point the audio sensors more directly toward the initially calculated location of the spill incident in order to listen for future spill sounds. For example, the spill detection system may include a sensor orientation module being executed by a computing device as described further herein that receives the initially calculated location of the spill incident and transmits a command to the audio sensors to adjust the sensor orientation of the audio sensors to point more directly towards the detected sound.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

Figure 1:
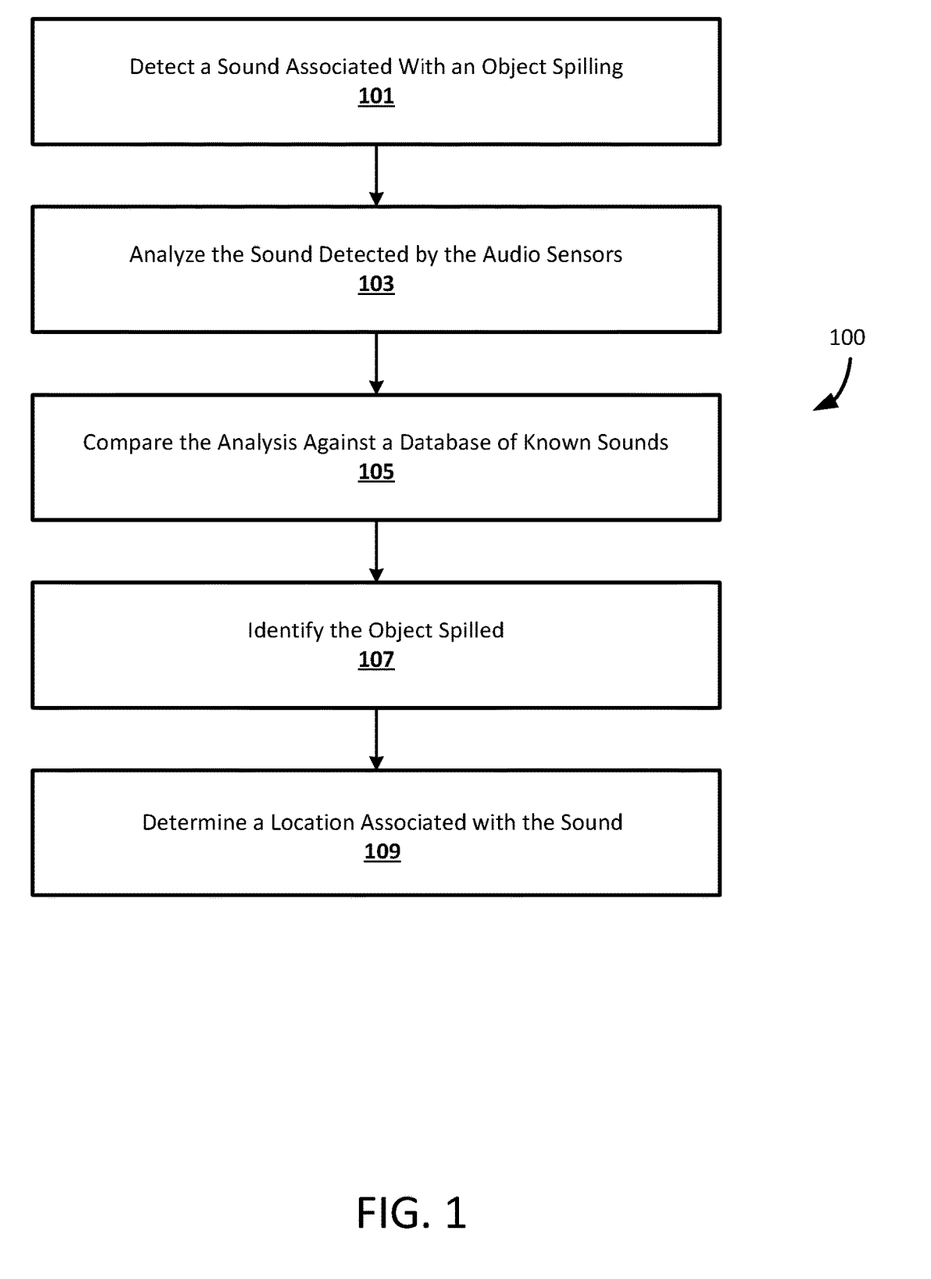
FIG. 1 is a flowchart illustrating an exemplary method for audibly detecting spills, according to an embodiment.

FIG. 1 is a flowchart illustrating a method 100 for detecting spills, in accordance with an exemplary embodiment. It will be appreciated that the method is programmatically performed by one or more computer-executable processes executing on, or in communication with, one or more computing systems or processors described further below. In step 101, one or more audio sensors detect a sound potentially associated with an object spilling on a surface. In some embodiments, the audio sensors can be distributed throughout an enterprise, warehouse, storage area, or residence. The audio sensors can include, for example, a network of microphones mounted on the ceiling or walls at strategic locations within a building. In some embodiments, different subsets of the audio sensors can be tuned to detect different spill incidents, such as liquid leaks, splashes, glass breakage, etc. In some embodiments, the sensors can also be configured to filter out background noise, human speech, or other noises not associated with an object falling or spilling.

In step 103, a processing device executes a sound processing module that performs an analysis of the sound detected by the audio sensors. In some embodiments, the sound processing module uses a Fourier analysis to analyze the audible spectra of the sound detected by the audio sensors. This analysis can identify various features and characteristics of the detected sounds. Those skilled in the art will recognize that different objects will create sounds having different acoustical characteristics when they fall on different surfaces. In some embodiments, these acoustical characteristics can be identified using a Fourier analysis.

In step 105, the sound processing module compares the analysis of the sound analyzed in step 103 against a database of known sounds corresponding to different types of known spill incidents. Those skilled in the art will recognize that particular types of sounds can have common acoustical characteristics. For example, the sound of a liquid spilling onto a tile surface will have different acoustical characteristics than human speech or the sound of grapes falling onto a tile surface. Similarly, glass bottles, plastic containers, metal cans, etc. all create sounds having particular acoustical characteristics when they fall onto a particular surface. In some embodiments, a database of known sounds or sound profiles corresponding to various types of spill incidents, such as glass bottles breaking or water dripping, can be generated by recording and analyzing the sounds created when different objects fall onto different surfaces. Such a database can be compared against the analysis of the detected sound computed in order to potentially identify the object causing the sound.

In step 107, the sound processing module identifies the object spilled by matching the analysis of the sound and a type of spill incident in the database of known sounds. In some embodiments, the comparison performed in step 105 results in a match between the analysis of the sound detected by the sensors and one of the sounds or sound profiles included in the database of known sounds. When such a match is detected, the sound processing module identifies the object spilled as the object or substance corresponding to the matched sound in the database.

In step 109, the processing device executes a location analysis module to triangulate the sensor data from the audio sensors detecting the sound and determines a location associated with the sound generated by the spilled object. In some embodiments, the location of each of the audio sensors is known and can be used by the location analysis module to triangulate the location of sounds detected by the sensors based on for example the signal strength at each sensor detecting the sounds. Once the location analysis module has identified the location of the spilled object and the sound processing module has identified the object spilled, this information can be provided to an individual responsible for cleaning the spill, in some embodiments.

Figure 2:
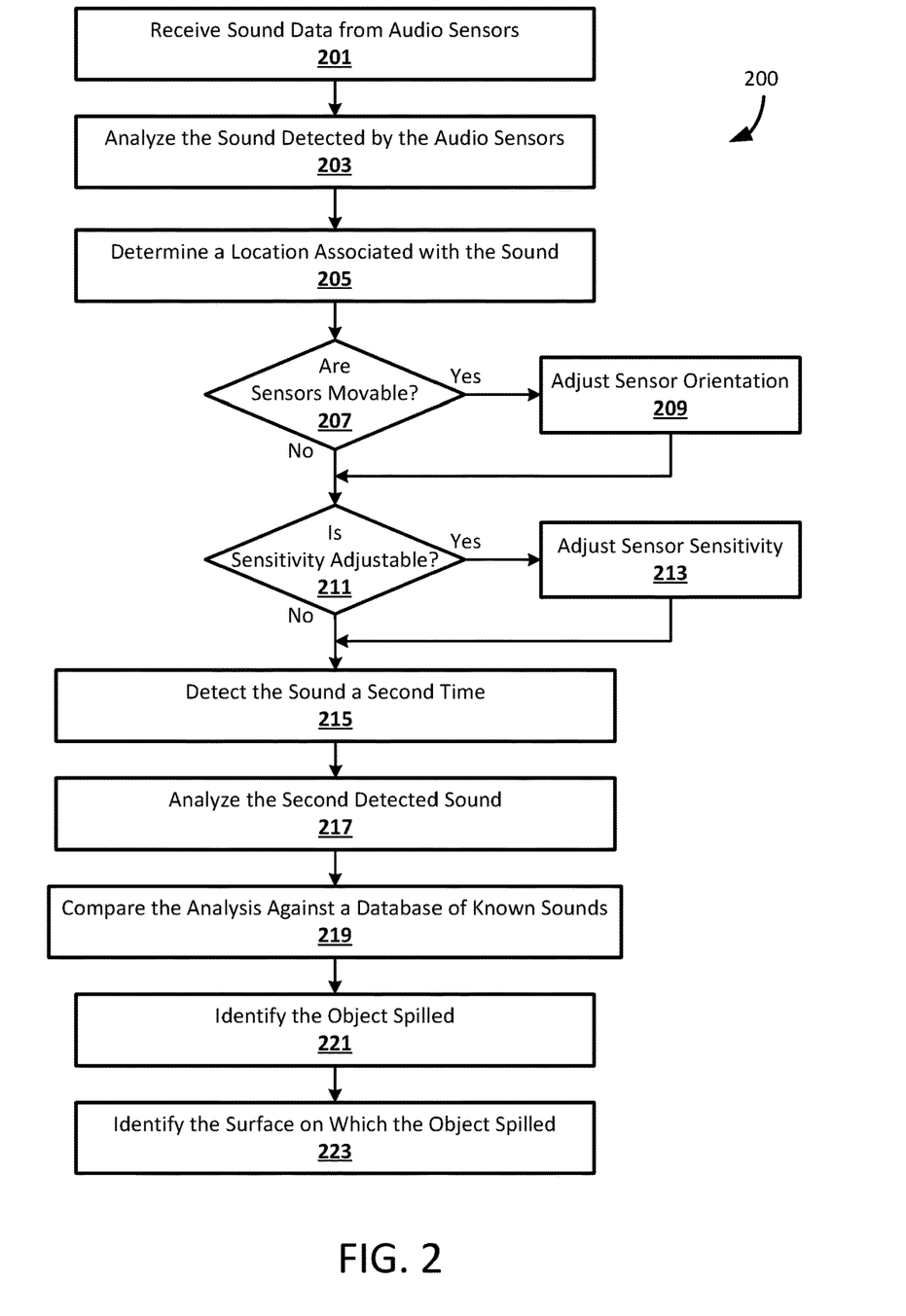
FIG. 2 is a flowchart illustrating another exemplary method for detecting spills using audio sensor adjustment, according to an embodiment.

FIG. 2 is a flowchart illustrating another method 200 for detecting spills using audio sensor adjustment, in accordance with an exemplary embodiment. It will be appreciated that the method is programmatically performed by one or more computer-executable processes executing on, or in communication with, one or more computing systems or processors described further below. In step 201, a sound analysis module receives sound data detected by one or more audio sensors that are associated with an object spilling on a surface. In some embodiments, a number of audio sensors can be located at strategic locations within an enterprise, warehouse, storage area, residence, etc. and can be in communication with the processing device using a wired or wireless communication channel. In some embodiments, the audio sensors can be divided into different subsets, with each subset of sensors configured to detect different types of spills, such as liquid leaks, splashes, glass breakage, etc. In some embodiments, the sensors can also be configured to filter out background noise, human speech, or other noises not associated with an object falling or spilling.

In step 203, the sound processing module performs an analysis of the sound received from the audio sensors. In some embodiments, the sound processing module uses a Fourier analysis to analyze the audible spectra of the sound received from the audio sensors. This analysis can identify various features and characteristics of the detected sound. Those skilled in the art will recognize that different objects will create sounds having different acoustical characteristics when they fall on different surfaces. In some embodiments, these acoustical characteristics can be identified using a Fourier analysis.

In step 205, the processing device executes a location analysis module to triangulate the sensor data received from the plurality of audio sensors. The triangulation of the sensor data is used to determine a location associated with the sound received from the audio sensors. In some embodiments, the location of each of the audio sensors is known and can be used in combination with the respective detected signal strengths at each sensor to triangulate the location of sounds detected by the sensors. It will be appreciated that other mechanisms for detecting sound location of detected sounds other than triangulation may also be utilized by embodiments. For example, a sound location may also be estimated when two or fewer audio sensors detect the sound and triangulation is not possible.

In step 207, the system determines whether the audio sensors are movable or adjustable. If the audio sensors are adjustable, the method continues to step 209 where a command is sent by a sensor adjustment module to the audio sensors to adjust their orientation so that they are pointed more directly toward the location of the detected sound as evaluated by the triangulation of the sensor data. Adjusting the orientation of the audio sensors allows the sensors to more accurately detect future sounds from the location of a spill. In some embodiments, the detected sound is associated with a recurring spill, such as a drip or a leak, and future sounds from the recurring spill can be more clearly detected if the orientation of the audio sensors is adjusted.

After the orientation of the audio sensors is adjusted in step 209, or if the sensors orientation is not adjustable, the method continues to step 211 where the system determines whether the sensitivity of the audio sensors is adjustable. If the sensitivity of the audio sensors is adjustable, the method continues to step 213, where the sound processing module adjusts or tunes the audio sensors to more accurately detect a particular type of sound. For example, in some embodiments, if the sound of a liquid dripping onto a surface is initially received in step 201, the sensitivity of the audio sensors can be adjusted to filter out non-liquid sounds and more accurately listen for any recurring liquid spills.

After the sensitivity of the audio sensors is adjusted in step 213, or after it is determined in step 211 that the sensitivity of the audio sensors is not adjustable, the method continues with step 215 where, once the orientation and/or sensitivity of the audio sensors have been adjusted, the sound may be detected a second time if it is a continuing type of spill event such as a drip or leak, as opposed to a one-time event such as would occur following the dropping of a bottle and the corresponding spill of liquid from the dropped/broken bottle. In step 215, the audio sensors may detect the sound a second time and transmit the sounds to the sound processing module. In step 217 the second detected sound may be analyzed by the sound analysis module, as described above in reference to step 203.

In step 219, the processing device executes the sound processing module to compare the analysis of the sound computed in step 203 and/or the second detected sound analyzed in step 217 against a database of known sounds corresponding to different types of spill incidents. Those skilled in the art will recognize that particular types of sounds can have common acoustical characteristics, and the same object can create different sounds when it falls on different surfaces. For example, glass bottles will generate sounds with acoustical characteristics that are distinct from metal cans, and a glass bottle falling onto a tiled surface will generate a sound with different acoustical characteristics than a glass bottle falling onto a linoleum surface. In some embodiments, a database of known sounds or sound profiles corresponding to various objects and surfaces can be generated by recording and analyzing the sounds created when different objects fall onto different surfaces. Such a database can be compared against the analysis of the sound computed in step 203 in order to potentially identify the object that has spilled and the surface on which the object has spilled.

In step 221, the sound processing module identifies the object spilled based on a match between the analysis of the sound and a type of spill incident in the database of known sounds. In some embodiments, the comparison results in a match between the analysis of the sound from the audio sensors and one of the sounds or sound profiles included in the database of known sounds. When such a match is detected, the sound processing module can identify the object spilled as the object or substance corresponding to the matched sound in the database. For example, if a match is detected between the sound of a glass bottle and the analysis of the sound, the object spilled can be identified as spilled from a glass bottle.

In step 219, the processing device executes the sound processing module to identify the surface on which the object has spilled based on a match between the analysis of the sound and a spill incident in the database of known sounds. In some embodiments, the comparison performed in step 215 results in a match that identifies the surface on which the object has spilled. For example, if a match is detected between the sound of a glass bottle on a linoleum surface and the analysis of the sound computed in step 203, the surface on which the object spilled can be identified as a linoleum surface.

Figure 3:
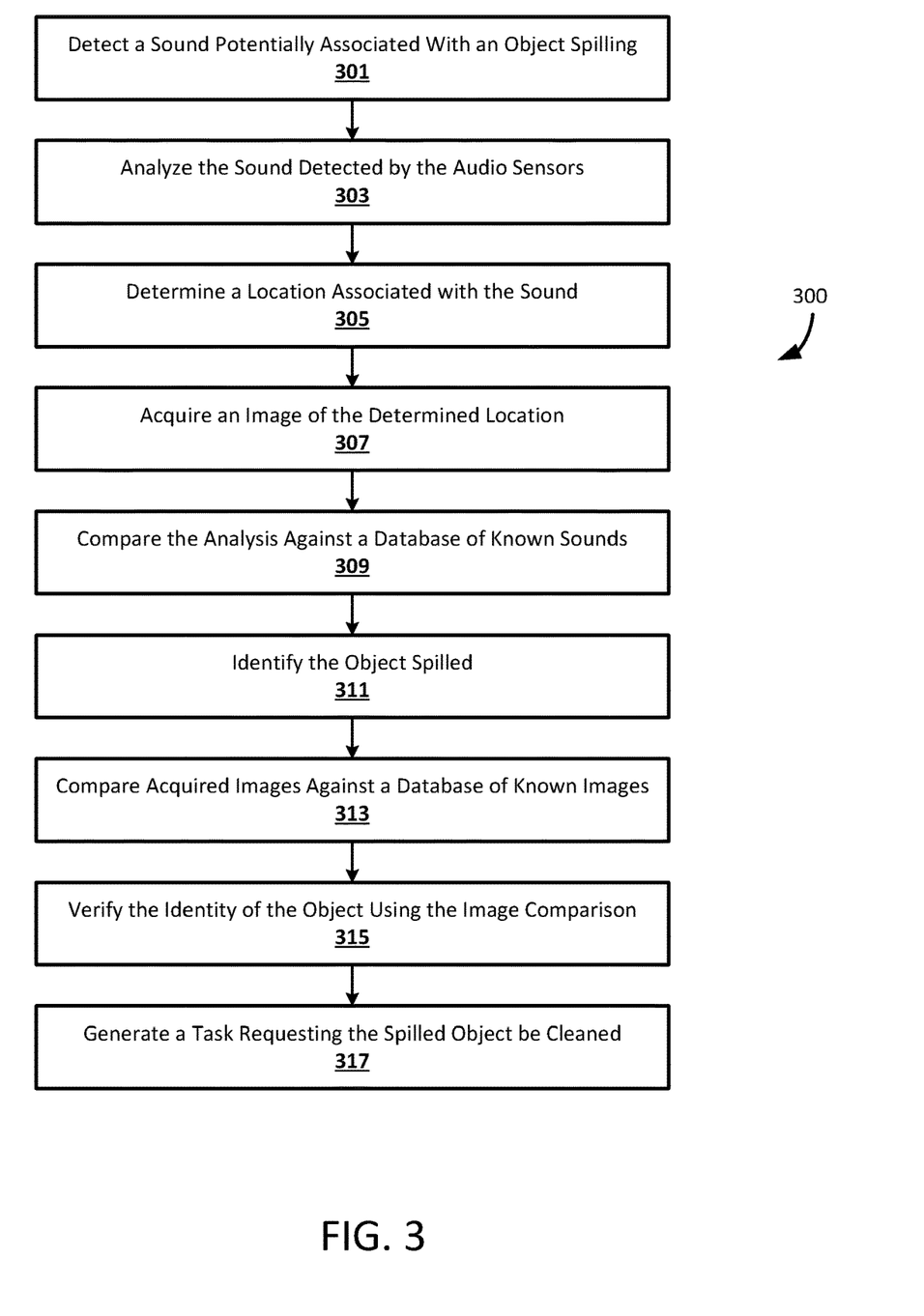
FIG. 3 is a flowchart illustrating another exemplary method for detecting spills using image acquisition to verify the type or location of the detected spill, according to an embodiment.

FIG. 3 is a flowchart illustrating another method 300 for detecting spills using image acquisition, in accordance with an exemplary embodiment. It will be appreciated that the method is programmatically performed by one or more computer-executable processes executing on, or in communication with, one or more computing systems or processors described further below. In step 301, one or more audio sensors detect a sound potentially associated with an object spilling on a surface. The audio sensors can include, for example, a network of microphones placed at strategic locations throughout an enterprise, warehouse, storage area, or residence. In some embodiments, different subsets of the audio sensors can be tuned to detect different spill incidents, such as liquid leaks, splashes, glass breakage, etc. In some embodiments, the sensors can also be configured to filter out background noise, human speech, or other noises not associated with an object falling or spilling.

In step 303, a sound processing module performs an analysis of the sound detected by the audio sensors. In some embodiments, the sound processing module analyzes the audible spectra of the sound detected by the audio sensors. This analysis can identify various features and characteristics of the detected sounds. Those skilled in the art will recognize that different objects will create sounds having different acoustical characteristics when they fall on different surfaces, and these acoustical characteristics can be isolated from background noise and identified as characteristic features of a spill. In some embodiments, these acoustical characteristics can be identified using a Fourier analysis.

In step 305, the location analysis module triangulates the sensor data from the audio sensors and determines a location associated with the sound generated by the spilled object. In some embodiments, the location of each of the audio sensors is known and can be used to triangulate the location of sounds detected by the sensors.

In step 307, one or more image devices acquire an image of the location determined to be associated with the detected sound. In some embodiments, the image devices can include cameras or video surveillance cameras that can be located at strategic locations throughout an enterprise, warehouse, storage area, residence, etc. The images captured by the image device can be used, for example, to confirm the identity of the object spilled, to confirm the location of the object spilled, and/or to assess the extent of the spill.

In step 309, the sound processing module compares the analysis of the sound computed in step 303 against a database of known sounds corresponding to different types of known spill incidents. As discussed above, particular spill incidents may generate known sounds with identifiable acoustical characteristics, and these known sounds can be stored in a database. In some embodiments, the analysis of the sound can be compared against a subset of known sounds or sound profiles corresponding to spill incidents expected near the location determined in step 305. For example, if the location of the spill is determined in step 305 to be in a produce section of a supermarket and away from metal cans or glass bottles, the sound processing module may begin by comparing the analysis of the sound computed in step 303 against a database of known sounds corresponding to known spill incidents of produce. After comparing the analysis of the sound computed in step 303 against known sounds corresponding to spill incidents expected near the location determined in step 305, the sound processing module can perform a broader comparison against known sounds in the database.

In step 311, the sound processing module identifies the object spilled by matching the analysis of the sound, computed in step 303, and a type of spill incident in the database of known sounds. In some embodiments, the comparison performed in step 309 results in a match between the analysis of the sound detected by the sensors and one of the sounds or sound profiles included in the database of known sounds. When such a match is detected, the sound processing module can identify the object spilled as the object or substance corresponding to the matched sound in the database.

In step 313, the processing device executes an image comparison module to programmatically compare the one or more images acquired in step 307 against a database of images of known objects. For example, if the object spilled is identified in step 311 as a gallon of liquid, the image acquired in step 307 can be compared against a database of images of gallon-sized containers of liquid. In some embodiments, this comparison can provide additional information about the object spilled, such as whether the object was a gallon of milk or a gallon of orange juice.

In step 315, the identity of the object spilled is verified by the spill detection system using the image comparison performed in step 313. In some embodiments, when a match is detected between an image acquired in step 307 and an image in the database of images of known objects, the system can verify the identity of the object spilled.

In step 317, the processing device executes a notification module to generate a task requesting that the surface upon which the object spilled be cleaned. In some embodiments, the priority of the task is determined based on the identity of the object spilled. For example, if a spill of a box of dry cereal and a spill of a bottle of milk are both detected, the notification module may assign a higher priority to the liquid spill because there is a greater chance that an individual can slip and injure themselves. If, however, a spill of a bottle of milk and a spill of a bottle of poisonous detergent are both detected, the notification module may assign a higher priority to the detergent spill because it poses a greater health hazard. In one embodiment, the task is transmitted electronically to an individual assigned to clean up the spill. For example, a notification may be sent to the individual's mobile device.

Figure 4:
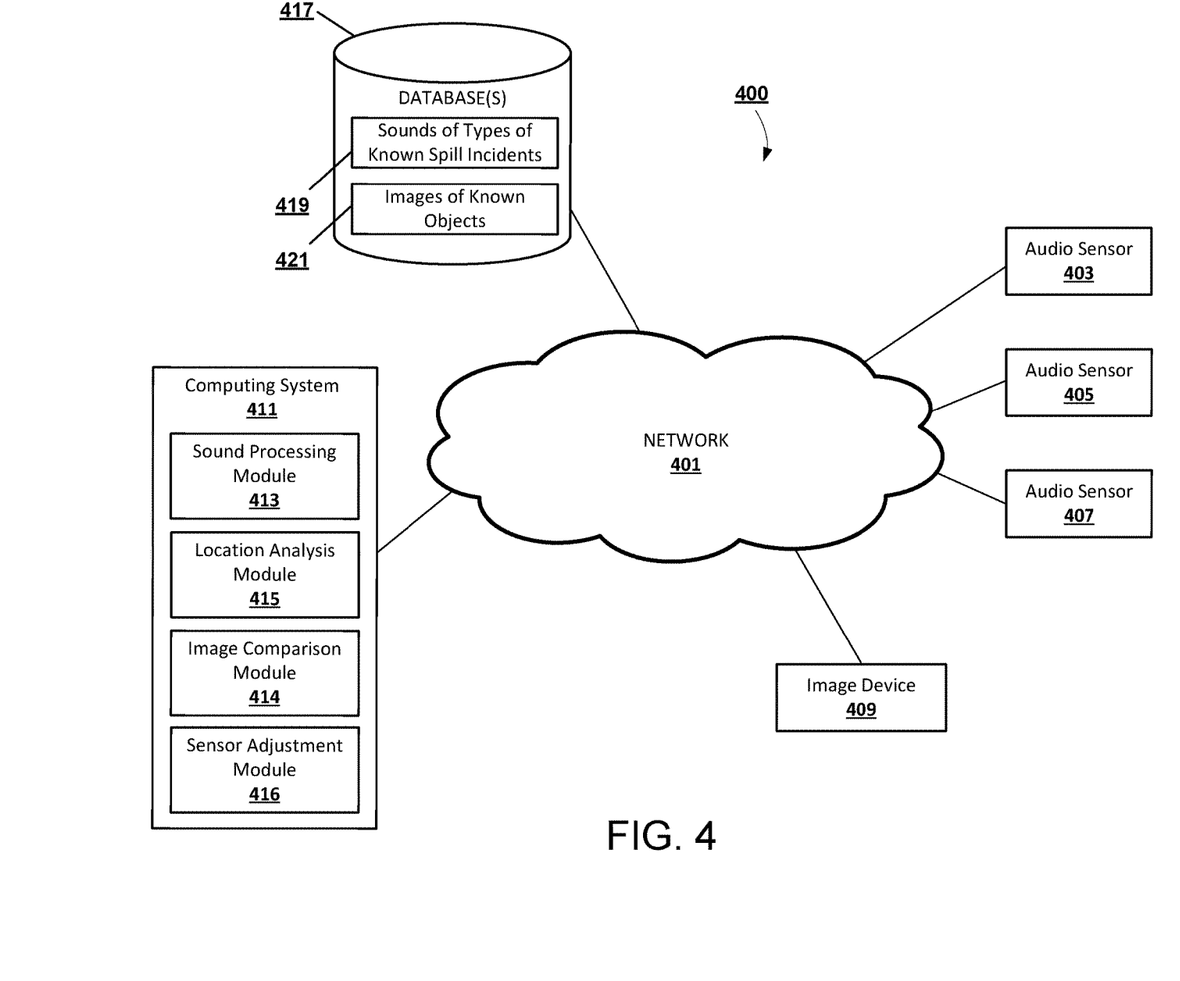
FIG. 4 is a diagram of an exemplary network environment suitable for a distributed implementation of an exemplary embodiment.

FIG. 4 illustrates a network diagram depicting a system 400 suitable for a distributed implementation of exemplary embodiments. The system 400 can include a network 401, multiple audio sensors 403, 405, 407, an image device 409, a computing system 411, and a database 417. As will be appreciated, various distributed or centralized configurations may be implemented. In exemplary embodiments, the computing system 411 can store a sound processing module 413 a location analysis module 415, an image comparison module 414, and a sensor adjustment module 416 which can implement one or more of the processes described herein with reference to FIGS. 1-3, or portions thereof. It will be appreciated that the module functionality may be implemented as a greater or lesser number of modules than illustrated, and that the same computing system or server could host one or more modules. It should further be appreciated that the functionality for the described modules may be combined or apportioned differently than as specifically described herein. The database 417 can store the sounds of known types of spill incidents 419 and the images of known objects 421, in exemplary embodiments.

The computing system 411, audio sensors 403, 405, 407, image device 409, and the database 417 may connect to the network 401 and be in communication with each other via a wired or wireless connection, in some embodiments. In some embodiments, the computing system 411 can communicate with the audio sensors 403, 405, 407 and image device 409 in order to receive audio data and images relating to a spill incident, as described above. The computing system 411 may include one or more applications such as, but not limited to, a web browser, a sales transaction application, an object reader application, and the like. The computing system 411 may include some or all components described in relation to computing device 500 shown in FIG. 5.

The communication network 401 may include, but is not limited to, the Internet, an intranet, a LAN (Local Area Network), a WAN (Wide Area Network), a MAN (Metropolitan Area Network), a wireless network, an optical network, and the like. In some embodiments, the computing system 411, audio sensors 403, 405, 407, image device 409, and the database 417 can transmit instructions to each other over the communication network 401. In exemplary embodiments, the sounds of known spill incidents 419 and the images of known objects 421 can be stored at the database 417 and received at the display computing system 411 in response to a service performed by a database retrieval application.

Figure 5:
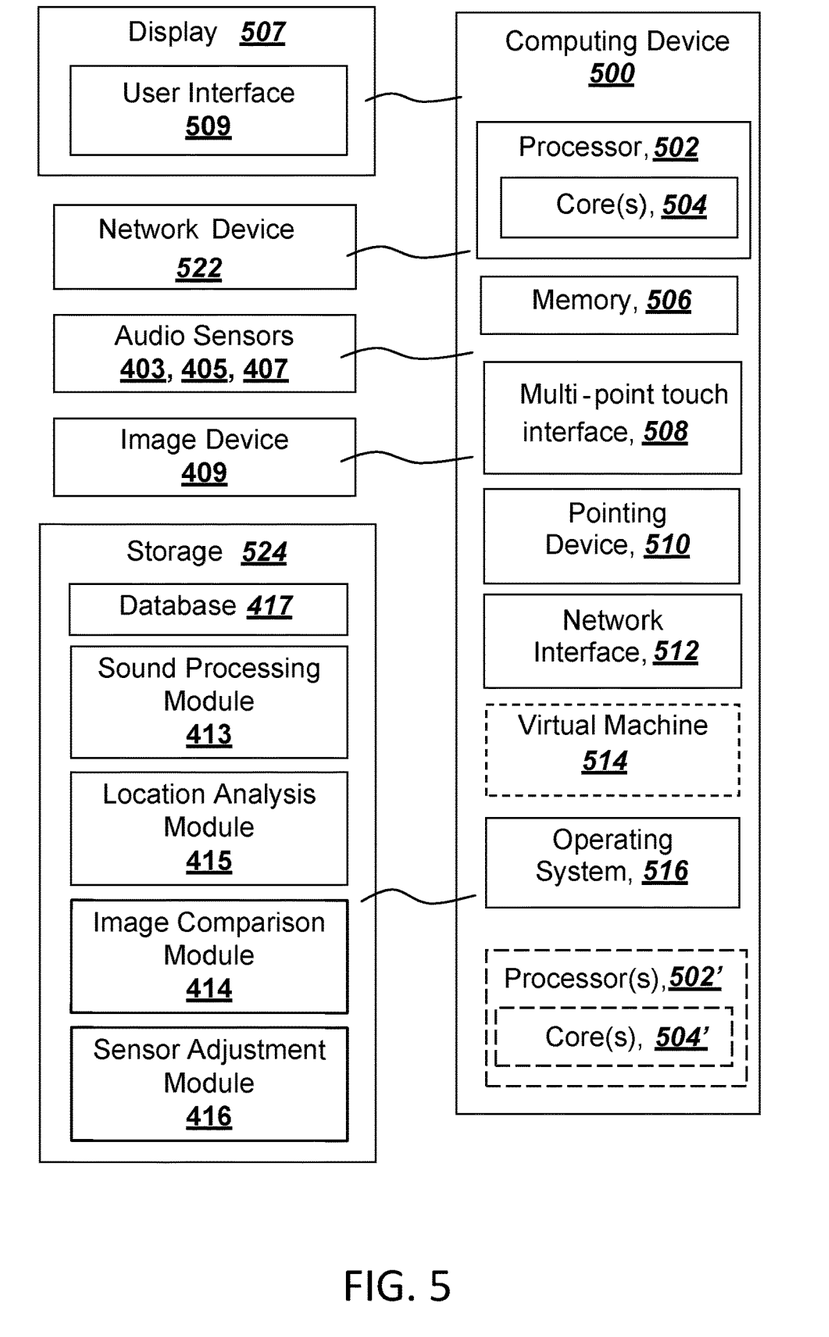
FIG. 5 is a block diagram of an exemplary computing device that can be used to perform exemplary processes in accordance with an exemplary embodiment.

FIG. 5 is a block diagram of an exemplary computing device 500 that can be used in the performance of any of the example methods according to the principles described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 506 included in the computing device 500 can store computer-readable and computer-executable instructions or software for implementing exemplary embodiments and programmed to perform processes described above in reference to FIGS. 1-3. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a display 507, such as an e-paper display, a LED display, an OLED display, a LCD, a touch screen display, or computer monitor, which can display one or more user interfaces 509 that can be provided in accordance with exemplary embodiments. The computing device 500 can also include other I/O devices for receiving input from a user, for example, a keyboard or any suitable multi-point touch interface 508, a pointing device 510 (e.g., a pen, stylus, mouse, or trackpad). The multi-point touch interface 508 and the pointing device 510 can be coupled to the display 507. The computing device 500 can include other suitable conventional I/O peripherals.

The computing device 500 can also be in communication with one or more audio sensors 403, 405, 407, and an image device 409. As discussed above, the audio sensors 403, 405, 407 can include a network of microphones configured to detect sounds associated with a spill, and the image device can include a camera configured to capture images or video of a location associated with the spill, as described above.

The computing device 500 can also include one or more storage devices 524, such as a hard-drive, CD-ROM, or other non-transitory computer readable media, for storing data and computer-readable instructions and/or software, such as a sound processing module 413, a location analysis module 415, an image comparison module 414, and a sensor adjustment module 416 that can implement exemplary embodiments of the methods and systems as taught herein, or portions thereof. Exemplary storage device 524 can also store one or more databases 417 for storing any suitable information required to implement exemplary embodiments. The databases 417 can be updated by a user or automatically at any suitable time to add, delete, or update one or more items in the databases. Exemplary storage device 524 can store one or more databases 417 for storing the sounds of known spill incidents 419, the images of known objects 421, and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run operating system 516, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with multiple elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for detecting spills comprising:
   a plurality of audio sensors configured to detect a sound potentially associated with an object spilling on a surface;
   a processing device equipped with at least one processor;
   a sound processing module executed by a processor in the processing device, the sound processing module configured to:
      perform an analysis of the sound detected by the plurality of audio sensors;
      compare the analysis of the sound detected by the plurality of audio sensors against a database of known sounds corresponding to a plurality of types of spill incidents;
      identify the object spilled based on a match between the analysis of the sound and a type of spill incident in the database of known sounds;
   a location analysis module executed by the processor, the location analysis module configured to:
      triangulate sensor data from the plurality of audio sensors to determine a location of the object spilled that is associated with the sound detected by the plurality of audio sensors; and
   one or more image devices configured to:
      communicate with the processing device,
      acquire one or more images of the determined location, and
      transmit the one or more images to the processing device,
   wherein the processing device is configured to execute an image comparison module using the one or more images to confirm an identity of the object spilled that was identified by the sound processing module.

2. The system of claim 1, further comprising a sensor adjustment module executed by the processor, the sensor adjustment module configured to:
   transmit a command to at least one of the plurality of audio sensors to adjust an orientation based on the determined location associated with the sound detected by the plurality of audio sensors.

3. The system of claim 1, further comprising a sensor adjustment module executed by the processor wherein the sensor adjustment module is configured to:
   adjust a sensitivity of the plurality of audio sensors based on the analysis to filter out types of sounds.

4. The system of claim 1, wherein the sound processing module is further configured to:
   identify the surface on which the object spilled based on a match between the analysis of the sound detected by the plurality of audio sensors and a type of spill incident in the database of known sounds.

5. The system of claim 1, further comprising a notification module executed by the processor, the notification module configured to:
   generate a task for an individual assigned to clean spills requesting that the surface upon which the object spilled be cleaned, a priority of the task determined based on the identity of the object spilled; and
   transmit the task to the individual.

6. The system of claim 1 wherein the processing device is further configured to:
   programmatically compare the one or more acquired images to a database of images of known objects that produce the plurality of known sounds so as to verify the identity of the object.

7. A method for detecting spills comprising:
   detecting a sound using a plurality of audio sensors;
   performing an analysis of the sound detected by the plurality of audio sensors using a sound processing module executed by a processor in a processing device;
   comparing, using the sound processing module, the analysis of the sound detected by the plurality of audio sensors against a database of known sounds corresponding to a plurality of types of spill incidents;
   identifying, using the sound processing module, an object spilled based on a match between the analysis of the sound and a type of spill incident in the database of known sounds;
   triangulating sensor data from the plurality of audio sensors to determine a location associated with the detected sound;
   acquiring, via one or more image devices, one or more images of the determined location; and
   confirming an identity of the object spilled that was identified by the sound processing module using the one or more images.

8. The method of claim 7, further comprising:
   transmitting a command to adjust an orientation of the plurality of audio sensors based on the determined location associated with the sound detected by the plurality of audio sensors.

9. The method of claim 8, further comprising:
   detecting the sound potentially associated with the object spilling on the surface a second time following the adjustment of the orientation.

10. The method of claim 7, further comprising:
    adjusting a sensitivity of the plurality of audio sensors based on the analysis of the sound detected by the plurality of audio sensors.

11. The method of claim 7, further comprising:
    identifying the surface on which the object spilled, using the sound processing module, based on a match between the analysis of the sound detected by the plurality of audio sensors and a type of spill incident in the database of known sounds.

12. The method of claim 7, further comprising:
    generating a task, using a notification module executed by the processor, requesting that the surface upon which the object spilled be cleaned, a priority of the task determined based on the identity of the object spilled; and
    transmitting the task to an individual assigned to clean up the spill.

13. The method of claim 7 wherein further comprising:
programmatically comparing the one or more images to a database of images of known objects that produce the plurality of known sounds so as to verify the identity of the object.

14. A non-transitory machine readable medium storing instructions executable by a processing device, wherein execution of the instructions causes the processing device to:
detect a sound using a plurality of audio sensors;
perform an analysis of the sound detected by the plurality of audio sensors using a sound processing module executed by the processing device;
compare, using the sound processing module, the analysis of the sound detected by the plurality of audio sensors against a database of known sounds corresponding to a plurality of types of spill incidents;
identify an object spilled, using the sound processing module, based on a match between the analysis of the sound and a type of spill incident in the database of known sounds;
triangulate sensor data from the plurality of audio sensors to determine a location associated with the sound;
acquire, via one or more image devices, one or more images of the determined location; and
confirm an identity of the object spilled that was identified by the sound processing module using the one or more images.

15. The non-transitory machine readable medium of claim 14, wherein execution of the instructions further causes the processing device to:
identify the surface on which the object spilled, using the sound processing module, based on a match between the analysis of the sound detected by the plurality of audio sensors and a type of spill incident in the database of known sounds.

16. The non-transitory machine readable medium of claim 14, wherein execution of the instructions further causes the processing device to:
adjust a sensitivity of the plurality of audio sensors based on the analysis of the sound detected by the plurality of audio sensors.

17. The non-transitory machine readable medium of claim 14, wherein execution of the instructions further causes the processing device to:
execute a notification module to generate a task requesting that the surface upon which the object spilled be cleaned, wherein a priority of the task is determined based on the identity of the object spilled; and
transmit the task to an individual assigned to clean the spill.

18. The non-transitory machine readable medium of claim 14, wherein execution of the instructions further causes the processing device to:
transmit a command to adjust an orientation of the plurality of audio sensors based on the determined location associated with the sound detected by the plurality of audio sensors.

19. The non-transitory machine readable medium of claim 18, wherein execution of the instructions further causes the processing device to:
detect the sound potentially associated with the object spilling on the surface a second time following the adjustment of the orientation.

* * * * *